Nov. 29, 1932.    J. J. LERAY    1,889,255
ROTOPLANE
Filed April 19, 1932    7 Sheets-Sheet 1

Inventor:
Joseph J. Leray

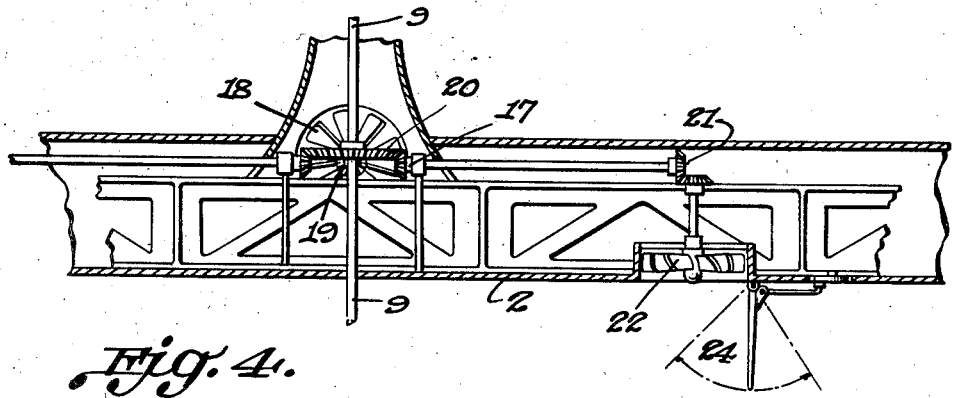
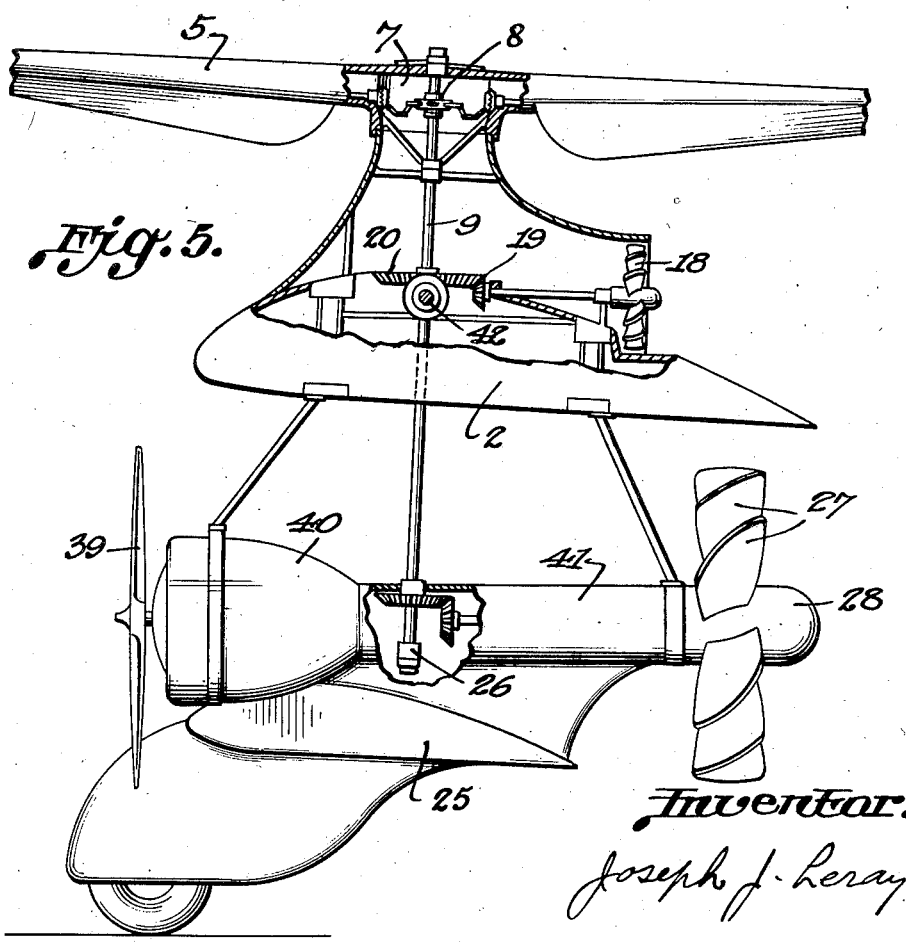

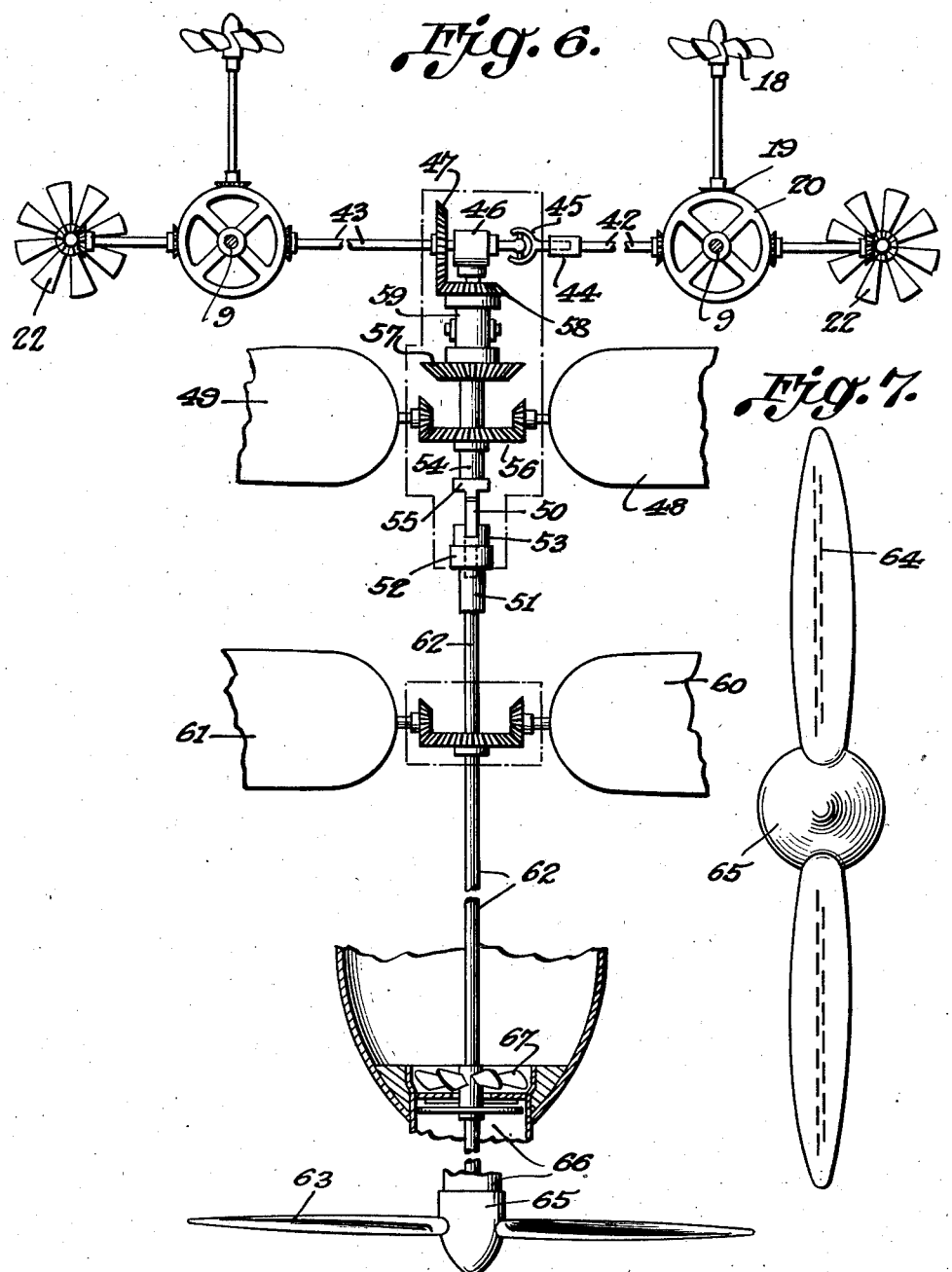

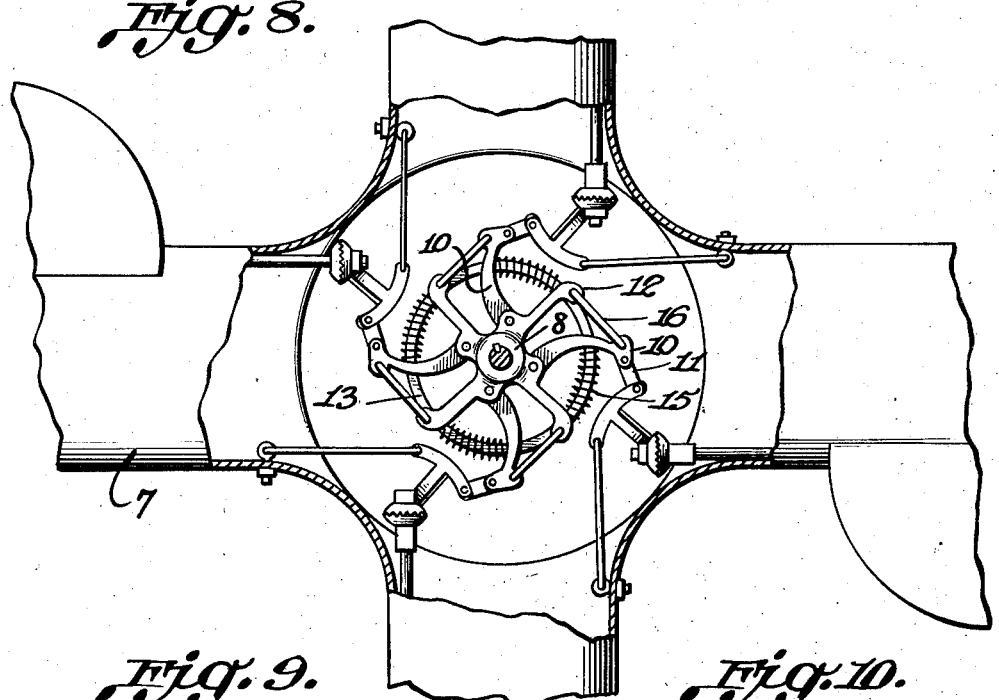
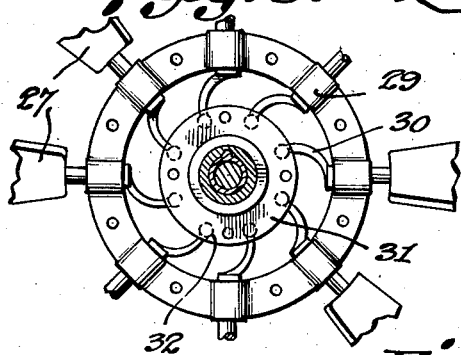
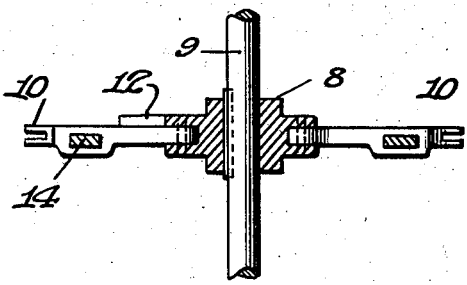
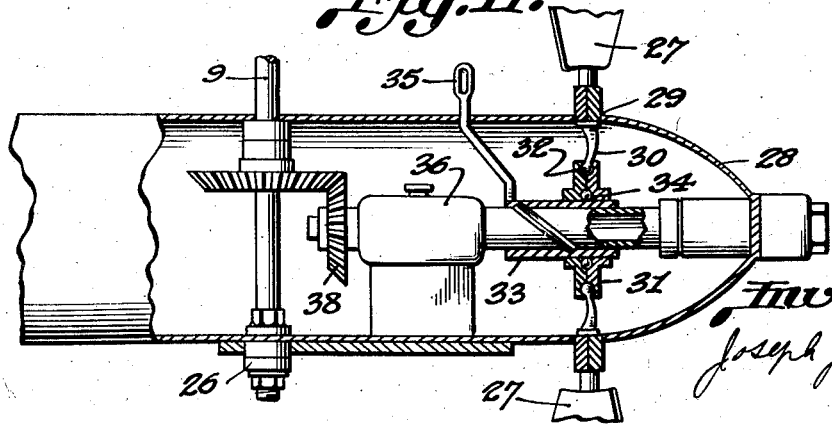

Nov. 29, 1932.         J. J. LERAY              1,889,255
                        ROTOPLANE
               Filed April 19, 1932    7 Sheets-Sheet 5

Inventor:
Joseph J. Leray

Inventor:
Joseph J. Leray

Nov. 29, 1932.    J. J. LERAY    1,889,255
ROTOPLANE
Filed April 19, 1932    7 Sheets-Sheet 7

Inventor:
Joseph J. Leray

Patented Nov. 29, 1932

1,889,255

UNITED STATES PATENT OFFICE

JOSEPH J. LERAY, OF WEST WARWICK, RHODE ISLAND

ROTOPLANE

Application filed April 19, 1932. Serial No. 606,301.

The invention relates to improvement in rotoplanes, first—increasing the lift of wings and airscrews, and increasing the thrust of propellers by internal suction being applied separately or simultaneously to said wings, airscrews and propellers. The application of said suction producing vacuum on one side of the airfoil and the ejection of the sucked air on the opposite side increasing the pressure, or when ejected sternwardly decreasing the drag; the ejection of air being used for cooling purpose in some instance.

Second—To develop power from the energy of the slipstream of propellers and from relative winds, to drive sucking devices and rotate airscrews. The kinetic energy of said slipstream and relative winds being converted into power by rotors from which derives the name of the aircrafts, rotoplanes.

Third—The improvement of rotors or air turbines, being a combination of small airfoils assembled together around a common hub; these rotors developing their power not only by the resistance of the wind or positive pressure, as previously invented, but by positive and negative pressure or suction as an airfoil having lift and drag, exactly as a wing in airplane. Such improvement making them considerably more powerful and still being much reduced in drag than rotors or air motors operating solely by the resistance opposed to the wind by their blades. These rotors being improved otherwise by working in free air permitting the whole blade to be entirely efficient at all points of the disc of rotation, without being shielded part of the time or requiring the use of deflectors, as deflectors and rotors partly shielded entail considerable parasite drag and produce undesirable moments along some axis of the aircraft in flight.

Fourth—To decrease the parasite drag and increase the thrust power of large rotoplanes by using several geared motors to turn a common large propeller, said common propeller having internal suction applied to it.

Fifth—To obtain, by varied combinations, air crafts, rotoplanes, with great lifting capacity, specially suited to carry heavy loads, with slow landing facilities, and having a reserve of power for safety.

The rotoplanes are incorporating some of the improvements contained in my previous inventions on airplanes with sucking wings #593,795 filed February 18, 1932 and those of the helicoplanes #604,963 filed April 13, 1932, but differ from those airplanes and helicoplanes by the use of rotors or air turbines for auxiliary power, differ also in the mode of operation, the airplane depends only on the speed of advance to develop sustaining lift, the helicoplane can obtain sufficient sustaining lift without advancing at all, while the rotoplane developing some sustaining lift before it starts to roll, still depends on the full slipstream and relative wind to obtain sufficient sustaining lift, needs the propellers to turn full speed and necessarily the rotoplane will dash forward and rise on an oblique path, developing very powerful lift more quickly than airplanes, but will not rise vertically as helicoplanes. The rotoplane is naturally more adaptable for multi-motored aircrafts, is made for heavy loads, it is comparable in aviation to what the trucks are to the automobile. The great lifting capacity of rotoplane can be used solely to carry heavier loads or use the extra lift for easier and better landing, or compromise between these two cases.

The rotors are an assemblage of small airfoils, they are arranged to turn, relatively to propellers, very slowly, then their efficiency as airfoils could be made as efficient as ordinary wings in airplanes, the lift being developed by positive and negative pressure or suction, the efficiency being measured by the ratio of lift to drag commonly known as L/D. Here is where the superiority or improvement of this kind of rotors developing their thrust power on the L/D principle, the lift of the blade being the turning moment or thrust. The angle of incidence of the blade being adjustable, naturally to obtain the maximum power from the rotor, the blades will be adjusted to an angle of incidence corresponding to the angle of attack of a wing where said wing is developing its maximum lift, this is the adjustment preferable for landing. For cruising speed the angle of incidence will be the one corresponding to the best L/D, exactly as the angle of attack of the best L/D is chosen for a wing. It is obvious from such a consideration, the rotors mentioned in this invention have a marked improvement and a great superiority to any previous rotors deriving their thrust solely from the drag, the thrust being equal to said drag, while a properly constructed rotor on airfoil principle may develop a thrust equal to the L/D of the airfoil or over twenty times the drag.

The invention is illustrated in the accompanying drawings in which Fig. 1 is a vertical elevation of the front view of a six-motor rotoplane.

Fig. 4 is a detailed sectional view of a part of the wing showing the arrangement and location of blowers, one in the base of the turret, the other one underneath the wing.

Fig. 5 is a detailed view partly sectional of the relative position of the supporting stub wing, rotor, side motor, main wing and turret in cross section, fan and airscrew with their connections.

Fig. 6 is a diagrammatical plan view for the transmission of power for the inside motors, showing also the fan providing suction for the propeller and means of cooling.

Fig. 7 is a face view of the large propeller, the dotted lines indicating series of slots.

Fig. 8 is a detailed view for the transmission of power from the shaft to the airscrew.

Fig. 9 is a detailed view showing the assembly of the arms of the rotor blades to a slidable ring for adjustment of angle of incidence.

Fig. 10 is a detail of the boss shown on Fig. 8.

Fig. 11 is a cut showing the mechanism of the rotor for adjustment of blades and transmission of power.

Figure 12:
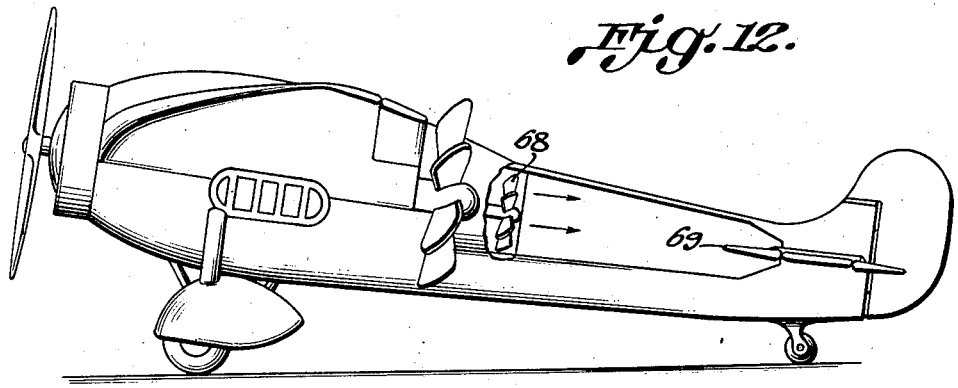
Figure 13:
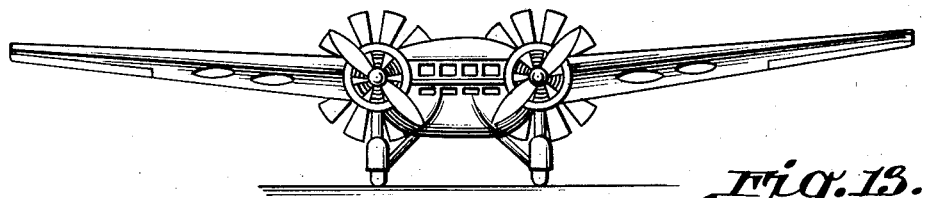
Figure 14:
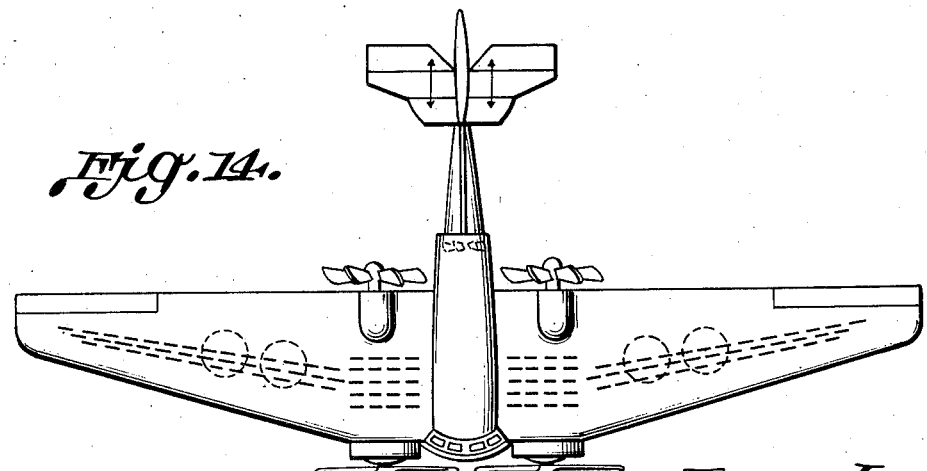

Figs. 12, 13, and 14 are respectively, a profile view, a front elevation and a plan view of an alternative rotoplane without airscrew.

Figure 15:
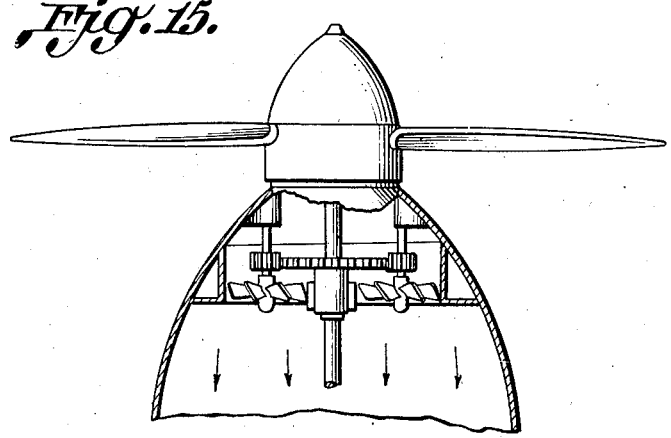

Fig. 15 is an illustration of the arrangement of gears when using several fans to obtain suction in propeller.

Figure 16:
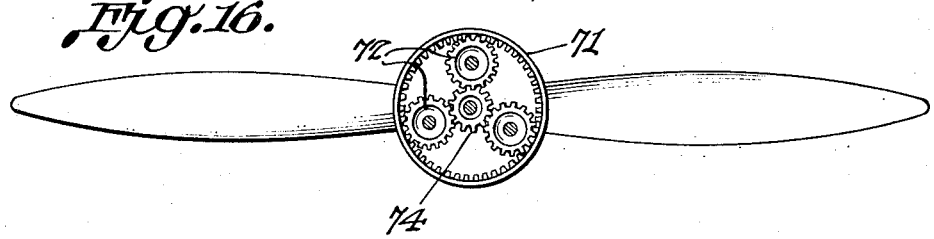

Fig. 16 shows the arrangement of gears for a propeller having the sucking device enclosed inside of the hub.

Figure 17:
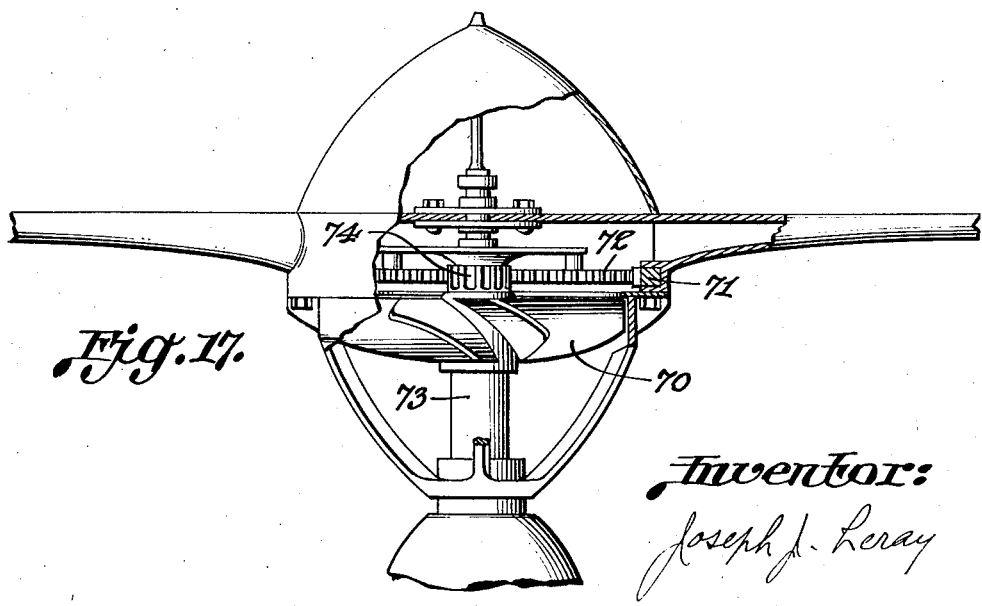

Fig. 17 is a detailed view of a propeller containing its sucking device within its hub.

Figure 18:
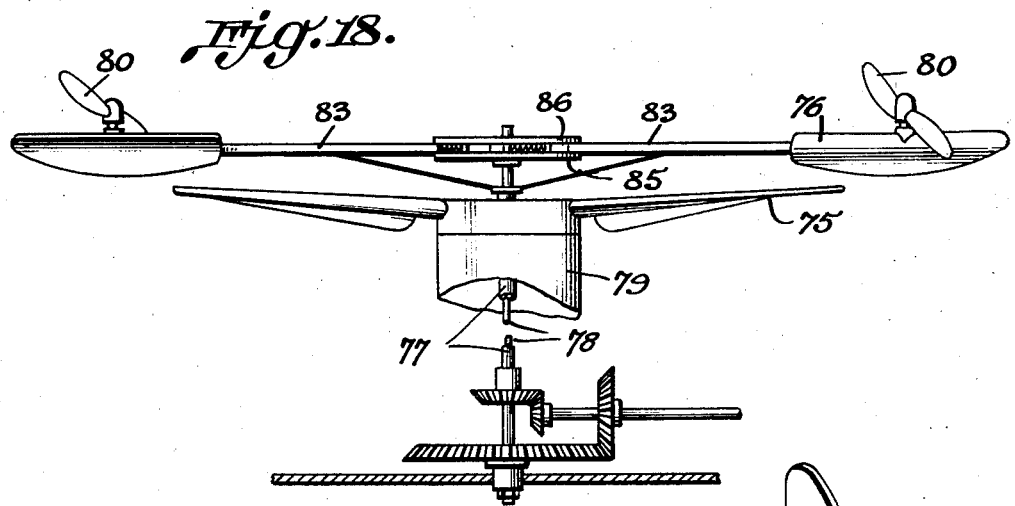

Fig. 18 is an illustraton of an alternative arrangement of the airscrews, having two concentric unequal airscrews within the same disc of rotation, with appropriate gears to turn them in opposite direction.

Figure 19:
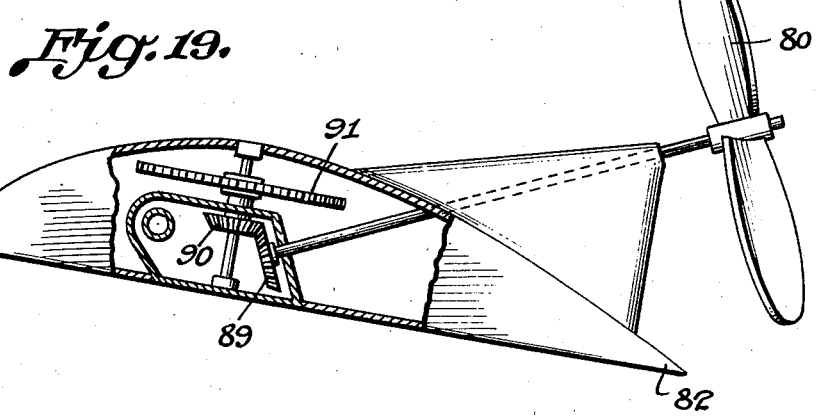

Fig. 19 shows a rotating wing with individual rotor.

Figure 20:
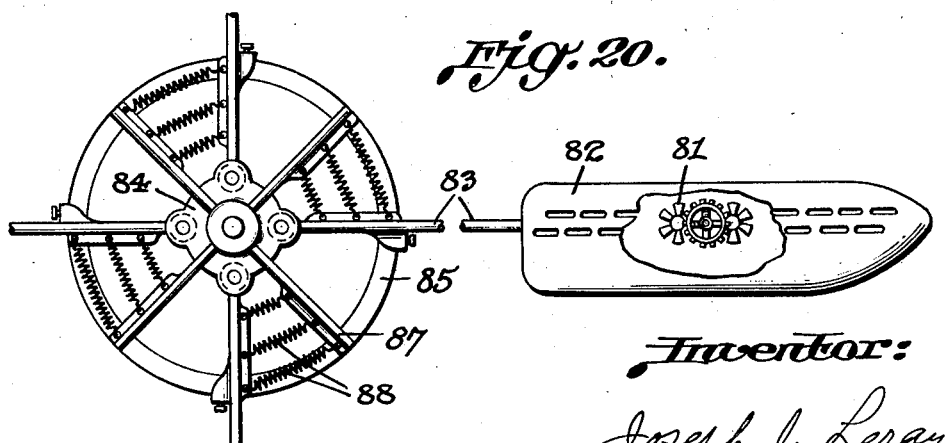

Fig. 20 is a detailed plan view of the assembly in the hub of the large airscrew shown on Fig. 18 with the top disc removed, showing also the location of sucking fans inside the rotating wing.

Figure 1:
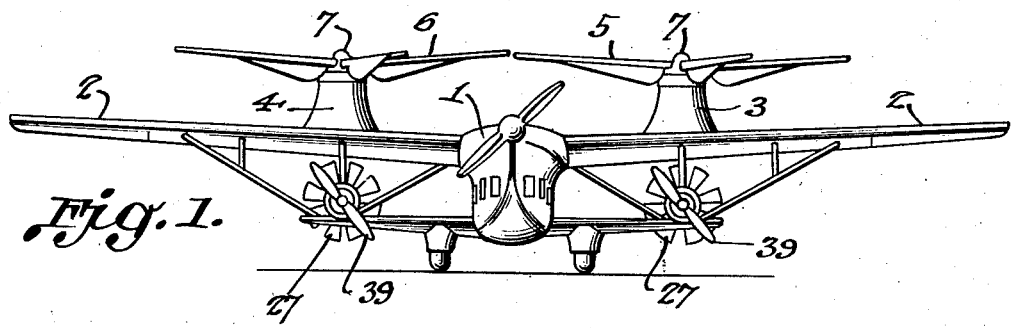
Figure 2:
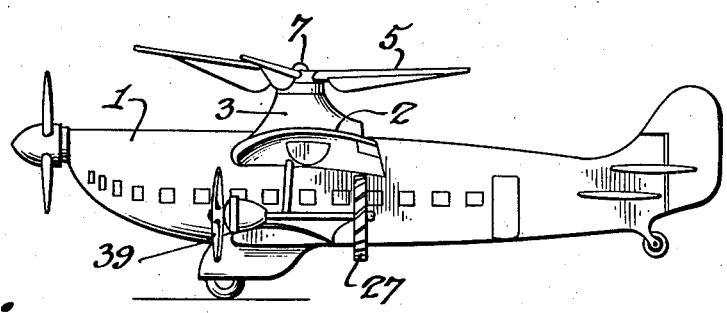
Fig. 2 is a profile view of the same rotoplane.
Figure 3:
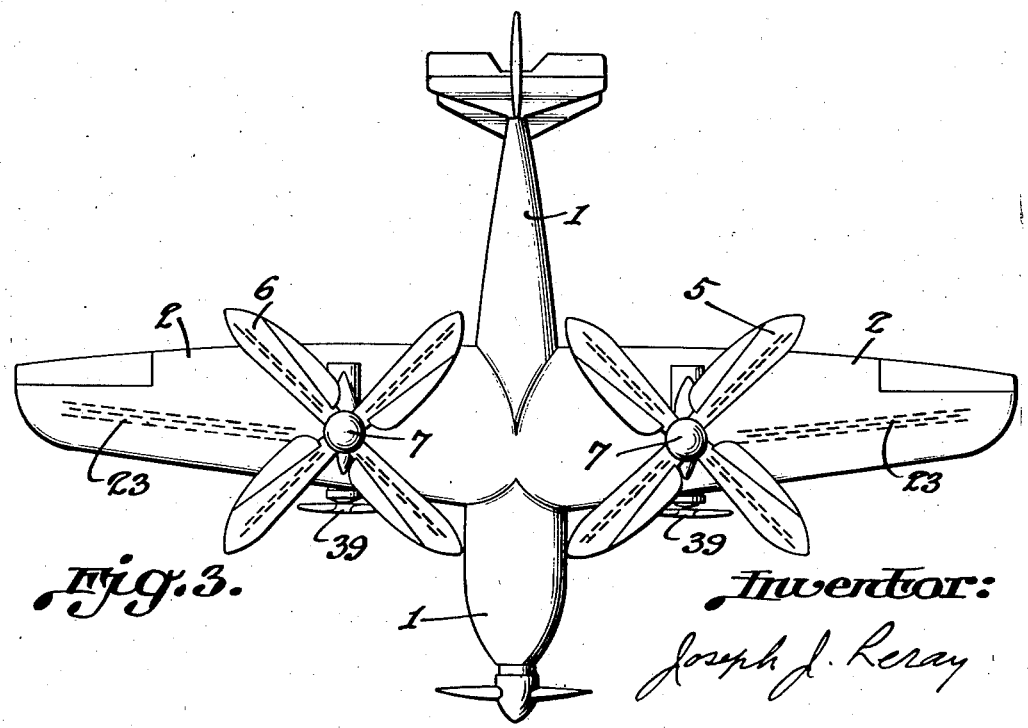
Fig. 3 is a plan view of the rotoplane shown on Figs. 1 and 2.

The body or fuselage of the rotoplane shown on Figs. 1, 2 and 3, is divided vertically in two floors, the first floor being the cabin, the second or upper floor housing four motors with their shafting and accessories, and the remaining space used to carry fuel and oil tanks and other equipments not represented. To the fuselage 1 is secured the main wing 2, carrying on its upper surface two hollow turrets 3, 4, one on each side of the fuselage at a distance from the center a little greater than the radius of the airscrews 5, 6, said airscrews rotating on the upper end of said turrets; the turrets being the bodies carrying and supporting the airscrews, whose large hub 7, Fig. 5, fits the top end circular opening of the turrets. Said hub encloses all the supporting members and assemblage for transmission of power as shown on Figs. 5 and 8. The airscrews 5 and 6 being identical to those described in a previous invention in helicoplanes #604,963 filed April 13, 1932, the description will not be repeated differing only by minor modifications in the hub assembly the boss 8, Figs. 5, 8 and 10, being secured to the vertical shaft 9, has four pivoted radial arms 10, Fig. 8, each connected to the flap of its respective airscrew blade by a link 11. The said boss has also 4 fixed arms 12, carrying a sectional ring 13, which holds the pivoted arms by passing and sliding through a slot 14, Fig. 10, made in said pivoted arm 10. Behind and against each pivoted arm 10 and between the following fixed arm 12 is a spiral compression spring 15 wound around and held by the ring 13, the action of said spring is supplemented by the tension of a rubber strand 16 attached to the pivoted arm 10 at one end and having the other end attached to the fixed arm ahead 12. This modification purporting to make a transmission much stronger than the one described in helicoplanes referred to above, thence more suitable for this large rotoplane. The boss is fixed fast to the vertical shaft, as with all motors off, the rotors are furnishing continually some power when the rotoplane is in flight, said power resulting from the relative wind.

The suction is produced inside the turrets by sucking fans or blowers 18, Fig. 5, housed in the base of said turrets, blowing sternwardly, said fans being rotated at high speed by suitable gearing 19 and 20 with the vertical shafts 9. Each said vertical shaft in passing the main wing 2 makes connection by suitable gears 17 and 21 and rotates another exhausing fan 22 Fig. 4, located on the bottom, inside, of the main wing, outwardly of the turret, said fan sucking the air through the upper surface of the wing and blowing it out downwardly through the lower surface of the wing, said wing having slots on its upper surface. Near this last-mentioned fan 22 under the wing, is hinged a fin 24, Fig. 4, to increase the lateral control of the rotoplane by drawing the fin in the slipstream of the fan 22, said fin working simultaneously with its associated aileron by the same control.

The vertical shaft 9, Fig. 5, extends down to the stub wing 25, on which it rests and is retained by suitable ball or roller bearing 26. At its lower end, the vertical shaft is connected to and is rotated by a rotor or air turbine by means of suitable gearing. Said rotor being formed by several small airfoils 27 arranged radially around a hub 28, and being moveable in their sockets 29, Figs. 9 and 11, permitting to change their angle of incidence. Said airfoils or blades having a curved arm extending inside the hub, and said curved arm 30 being retained to a slidable ring 31, Fig. 9, by a ball socket joint 32. The ring is fixed at the end of a tubular sleeve 33 on ball bearing 34 permitting said ring to rotate freely when the sleeve remains stationary, but follows said sleeve when the sleeve advances or retreats under the action of the control attached to a lever 35 secured to said sleeve. The forward or backward motion of the sleeve is obtained by turning said sleeve around its tubular mounting 36, Fig. 11, having a spiral bead or elongated tread which engages and fits a spiral groove cut in the inner side of the wall of said sleeve. The tubular mounting is solidly secured to the stub wing, and carries the rotor by having the driving shaft 37 of the rotor retained inside said mounting by the hub of the rotor bolted to it at one end, and the driving gear 38 keyed at the other end, all supported on suitable bearings and means of lubrication. The rotor generates its power by the kinetic energy of the slipstream of a propeller 39 driven by a motor 40, Fig. 5, placed immediately in front of said rotor. This motor 40 being secured to the stub wing and properly cowled in streamlined manner with the housing 41 of the rotor. The stub wing is an assemblage of strong structural members for supporting the side motors and rotors and brace the main wing. In flight the relative wind produced by the advance of the rotoplane provides another source of power for the rotors, so rotors are developing power even with all motors off providing the rotoplane advances.

To assure the stability of the rotoplane, the two airscrews 5 and 6 turn in opposite direction and are coupled together by two shafts 42 and 43, Fig. 6, united together inside the fuselage by a square shank 44 fitting and sliding into a square socket, allowing stretching to prevent tension strain. To this stretching connection is added a universal joint 45 to preserve smooth rotation under severe strain impairing the alinement of the shafts. The coupling shafts are supported near their junction point by a ball bearing 46 secured to the frame of the fuselage. The coupling shafts have a gear 47 to receive power through a transmission, from the two rear motors 48, 49, mounted inside the fuselage.

The said transmission sliding on a fixed counter-shaft 50 secured to the bearing 46 of the coupling shafts at one end and supported at the other end by a tubular fitting 51 secured at the end of the shaft 62 of the large propeller 63 said tubular fitting supporting the shaft 62 and counter-shaft 50, and turning on a ball bearing 52 attached to the frame, said fitting having a jaw 53 making connection with the transmission system to receive the power of the two rear motors 48, 49. The tubular fitting 51 turns freely around the counter-shaft 50.

The transmission system is formed by a tubular member 54 sliding on the counter-shaft 50 and having at one end a jaw 55 fitting the jaw 53 of the propeller shaft. The sliding member 54 carries toward the center two gears 56, 57, of the same dimension, one 56 engaging with the gears of the motors when said sliding member is pushed toward the rear, the end gear 58 of the sliding member engaging then the gear of the coupling shafts 47 and then the power of the two rear motors 48, 49, is on the airscrews, as illustrated on the drawing. When the sliding member is drawn back half way, all gears are disengaged, the motors 48, 49, run neutral. If the transmission is pushed up front further, the end jaw 55 engages with the jaw 53 of the shaft of the propeller, and at the same time the opposite middle gear 57 engages the motors and the power is on the propeller. The sliding member is pushed by a lever manually operated not represented, said lever being attached to a collar 59 on roller bearing placed between the end gear 58 and the middle gear 57.

Two more motors 60, 61, are geared to the shaft of the propeller, which shaft 62 extends forward through and out of the nose of the fuselage carrying at its end a large propeller 63 with hollow blades perforated with holes or slots 64, Fig. 7, on the face of blades; the giant propeller having a large hollow hub 65 open in the rear. Said opening establishing communication with a tube 66 leading inside of the fuselage, where one or several fans 67 driven by the shaft 62 of the propeller put a very high suction inside of the propeller. The air exhausted by the fans 67 is blown over the inside motors for cooling purpose and go out through the rear of the fuselage.

This invention is not intended to be limited to the rotoplane described above, as airscrews could be omitted as shown on an alternative rotoplane illustrated on Figs. 12, 13 and 14, applying the rotors just explained to drive sucking devices in wings and/or on rear part of the fuselage, to develop high vacuum on the upper surface of said wings, and increase the pressure on the under surface of said wings by ejecting the exhausted air into the path of the incoming relative wind and retarding its flow under the wings; the air being also exhausted with a blower 68, Fig. 12, in the rear of the fuselage blowing at close range on the control surfaces for efficiency of said control at low speed of advance. The horizontal fin having an extra elevator 69 hinged at the leading edge to take the full force of the slipstream of the blower. The said front elevator being articulated with the rear ones and serving to balance them.

When the air sucked from a propeller is not needed for other purpose, the sucking fan 70, Fig. 17, could be set right in the hub of said propeller, the hub making the annular gear 71, Fig. 16, of the planetary system driving the planet gears 72 attached to the housing 73, Fig. 17, of the shaft, and the hub of the fan making the sun gear 74, said fan 70 rotating around said housing 73, and ejecting the air outside behind the propeller.

The invention is intended to apply to any arrangement, size and number of airscrew, apply also to any kind of wing or airfoil as an illustration is given Figs. 18, 19, 20 where two airscrews 75, 76, unequal in size, turning in opposite direction, at a different number of revolutions in unit-time, are set concentrically super-imposed, the larger 76 above the smaller 75, the smaller having a tubular shaft 77, Fig. 18, housing the shaft 78 of the large airscrew, said inner shaft extending over the hub of the small airscrew to carry the larger airscrew. The small airscrew being installed on a hollow turret 79 located at the center of balance of the aircraft, having sucking devices and power transmission as described above. Said small airscrew sweeping such center portion of the common disc of rotation where the efficiency of the large airscrew is low or nul, while the large airscrew sweeps the outer part of the disc of rotation. The suction of said large airscrew being done individually by each blade carrying its own rotor 80 and sucking device 81, Fig. 20, similar to those already described, the blades of the rotor being not adjustable. Said rotor accomplishing a double function: first,—furnishing the power through suitable gears 89, 91, 90, Fig. 19, to the exhaust fans 81, contained in the blade; second,—acting as a governor of the blade incidence. The axis of the blade being ahead of the center of said blade, the trailing edge hangs down at rest, while in flight, said blade is raised by the pressure of the component wind resulting from the rotation of the airscrew and the motion of the aircraft in space, said component wind tending to raise the trailing edge 82 till it reaches zero degree incidence to said component wind; but the rotor 80 trailing the blade is set above at an angle with the chord of the blade, and the component wind acting on said rotor tends to lower said rotor till its center of pressure comes parallel to the direction of the component wind; the arrangement sets two opposite forces one against the other, the resultant of their combined action being to give automatically the blade its correct angle of incidence under all circumstances and conditions of flight. The blade is entirely free to turn around its arm or axle 83. When the blade is at zero degree angle of incidence, the moment of the arm of the blade is zero relatively to its axis and component wind then the arm-moment of the rotor to the same axis is maximum; conversely if the arm-moment of the rotor is zero, the blade moment is maximum, then the blade assumes an attitude where these two opposing moments come in equilibrium.

The blades of the large airscrew are carried by arms 83 attached to a vertical shaft 78 by means of a boss 84 to which they are pinned, free to move back and forth sliding on and between two supporting discs 85, 86, secured to four ribs 87, fixed to the center boss. Said arms of the airscrew are each attached to the rib ahead by several tension springs 88, which receive the impulse of the power driving the airscrew. The action of the springs permits the airscrew to slow down such blades by yielding back when meeting greater resistance at some point of the rotation, and reversely to accelerate such blades meeting smaller resistance at some other point, the all resulting in a more uniform application of the power for an advancing or retreating blade.

Said compound airscrew as described having suitable means to be driven in opposite direction continually by rotors and on option supplemented momentarily by motors as explained for the six-motor rotoplane. Said described rotors and airscrews having suitable means of braking at rest.

Other accessories completing rotoplanes are similar to those usually found in airplanes and will not be described.

From my invention in rotoplanes as described above,

I claim:

1. In rotoplanes of the airplane type, air motors or rotors with blades of the airfoil type, developing their thrust by negative and positive pressure or lift and drag, having said blades movable in thier sockets and being adjusted for angle of incidence and retained by a ring carried by a slidable sleeve moving on its tubular mounting fixed to the wing directly in the slipstream of a tractor propeller, said tubular mounting carrying inside a driving shaft to which is fixed, at one end, the rotor, and having, at the other end, a driving gear connected to a suitable gear and shaft system connecting the rotors to one or several exhaust fans or blowers, said exhaust fans drawing the air through series of slots from the upper surface of the wing, and exhausting said air under the wing, also exhausting the air from the rear of the fuselage directly onto the control at close range; having said rotors and fans coupled together; and having an additional elevator hinged to the leading edge of the horizontal fin articulated and balancing the two rear elevators.

2. In rotoplanes of the helicopter and airplane type, air rotors with adjustable blades of airfoil type developing positive and negative pressure, driven by the slipstream of tractor propellers, driven also in flight, by the relative wind, said tractor propellers being rotated by motors; a stub wing bracing the main wing and carrying at its outer ends rotors, motors and propellers, one on each side of the fuselage; having geared to said rotors, vertical rotatable shafts extending upwardly passing through the main wing and turrets fixed on and above said wing, said vertical shafts and turrets carrying at their upper end two sets of rotating wings or airscrews one on each side of the fuselage revolving inversely one to the other; the blades of said airscrews being hollow and having sucking slots on their upper surface, and having flaps appended to their trailing edge to which the power is transmitted, said flaps being held in raised position when the power is off, by rubber strands, said flaps being attached to a boss secured to the vertical shaft, by pivoted arms and links; said pivoted arm being restrained and fastened ahead to a fixed arm by a rubber strand, and pushed on the rear side by a compression spring retained by a sectional ring on which rests and slides the pivoted arm; a journal fixed to and supporting said airscrew on bearing fixed to a bar secured to the turret; an airscrew having a large hollow hub communicating interiorly from the side with the blades and from under with the hollow turret, said turret having an exhaust fan or blower in its base blowing sternwardly, said fan being rotated at high speed by the vertical shaft through suitable gears, exhausting the air from the turret and airscrew; and a fin hinged under the wing near the fan, capable of being drawn into the slipstream of said fan for lateral control purpose.

3. In rotoplanes of the helicopter and airplane type, having air rotors with adjustable blades of the airfoil type, driven by the relative wind and slipstream of propellers, rotatable vertical shafts driving indirectly hollow airscrews mounted at the upper end of turrets, having exhaust fans in turrets and wing and having a control fin, a system of shafts coupling the two airscrews, united inside the fuselage by a stretching joint made by a square shank and suitable socket, and a universal joint and being supported on ball or roller bearing.

4. In rotoplanes of the helicopter and airplane type, having air rotors with adjustable blades of the airfoil type, driven by the relative wind and slipstream of propellers, rotatable vertical shafts driving indirectly hollow airscrews mounted at the upper end of turrets, having exhaust fans in turrets and wing, having fins for control and coupling shafts, a gear attached to said coupling shafts to establish connection with motors by engaging a slidable transmission on a fixed countershaft, said transmission being slided by a collar actuated by a lever manually operated, having at one end a gear engaging the above mentioned gear of the coupling shafts, having two middle gears engaging alternately the motors, and having a jaw engaging a similar jaw at the end of the shaft of the large propeller placed at the nose of the rotoplane, more internal motors connected by suitable gears to said shaft of the large propeller, which is driven by said internal motors, said propeller being hollow and having slots in the blades for suction and a large hollow hub connected to the fuselage by a tube or cylinder carrying to the blades the suction of one or several exhaust fans driven inside the fuselage by the shaft of the propeller through suitable gears, said exhaust fan or fans blowing the air over the inside motors for cooling purpose.

5. In rotoplanes of the helicopter and airplane type, having air rotors with adjustable blades of the airfoil type driven by the relative wind and slipstream of propellers having suitable gears and shaft connections, a tubular vertical rotatable shaft placed at about the center of balance of the aircraft extending upwardly through a central turret, said tubular vertical shaft driving and supporting jointly with the turret an airscrew similar to the one described in claim 2, a second vertical shaft nestled inside the vertical tubular shaft extending further above and carrying a second airscrew or set of rotating wings on long arms, sweeping further out than the airscrew below, both airscrews turning around the same axis, the arms of said larger airscrew being pivoted to the vertical shaft and sliding between two discs fixed to said vertical shaft, said arms being restrained by several tension springs allowing the blades to yield on momentarily increased pressure of the drag; two airscrews of unequal diameter turning in opposite direction at a different number of revolutions in a unit time, said concentric airscrews being driven by the thrust of air rotors through suitable gears and shafts.

6. In rotoplanes of the helicopter and airplane type, having adjustable air rotors driven by the relative wind and the slipstream, driving two concentric airscrews unequal in diameter, turning at different number of revolutions in unit-time, said airscrews being placed at about the center of gravity at the upper end of two concentric vertical shafts, one inside the other, the smaller airscrew having suction through the blades, hub and turret by means of an exhaust fan; a larger airscrew having blades with individual rotor driven by the relative wind generated by the rotation, said rotors each driving a pair of exhaust fans located inside the blades ejecting the air under the blades, said rotors being set above and behind the trailing edge at angle with the cord of the blade, the drag of the rotor producing a downward moment opposing the upward drag-moment of the blade; said blade being free to turn around its supporting arm and the axis of said blade being ahead of the center of gravity of the section of the blade. Said rotor acting as universal governor of the angle of incidence of the blade.

7. In rotoplanes of the helicopter and airplane type, having air rotors with adjustable blades of the airfoil type, driven by the relative wind and slipstream of propellers, rotatable vertical shafts driving indirectly hollow airscrews mounted at the upper end of turrets, having exhaust fans in turrets and wing, having fins for control and coupling shafts, having all inside motors geared to a common shaft driving a large nose propeller, having transmission to connect part of the power to the airscrews; the nose propeller having slots for suction and a large hollow hub containing an exhaust fan within said hub, the hub making the annular gear of a planetary system, the planet gears being carried by the housing of the shaft and the sun gear being formed by the fan, said fan turning around the housing of the shaft and said propeller having its hub open on the rear side.

In witness whereof I hereunto affix my signature.

JOSEPH J. LERAY.